United States Patent Office 3,434,868
Patented Mar. 25, 1969

3,434,868
SILICON DIOXIDE COATINGS UTILIZING A PLASMA
Paul J. Jorgensen, Schenectady, N.Y., assignor to General Electric Company, a corporation of New York
No Drawing. Filed Oct. 14, 1965, Ser. No. 496,182
Int. Cl. B44d 1/18; C09d 5/18; G03g 19/00
U.S. Cl. 117—93                                    3 Claims

ABSTRACT OF THE DISCLOSURE

Silicon dioxide films are formed by vaporizing silicon monoxide in the presence of a plasma and oxygen in an environment of a pressure of 20–200 microns of mercury.

---

This invention relates to a process for the manufacture of a silica film and to the silica film thus produced, and more in particular, this invention relates to a method of producing a thin insulating film of silicon dioxide, and the novel method of producing such film.

Heretofore, silicon dioxide has been deposited from a gas stream consisting principally of oxygen in which silane, the hydride of silicon, is burned. This is not satisfactory because of the large excess of oxygen and hydrogen at the intense heat at which the silica is deposited and does not permit its decomposition on certain substrates, and also has the disadvantage of introducing into the silica a certain amount of combined water, which greatly affects the electrical resistance of the material manufactured by this method.

It is an object of the present invention to deposit silicon dioxide as a thin film on certain substrates.

It is another object of this invention to produce a film of silicon dioxide having the maximum electrical resistance.

It is still another object of this invention to produce an article whose surface is silicon dioxide that is carbon free and essentially water free.

The various features of novelty which characterize this invention are pointed out with particularity in the claims annexed to and forming a part of this specification. For a better understanding of the invention, however, its advantages and specific objects obtained with its use, reference should be had to the accompanying description in which has been described a preferred embodiment of the invention.

Silicon dioxide is deposited from a low energy radio frequency induced plasma suspended in a stream of oxygen, by introducing into the plasma silicon monoxide, which oxidizes to silicon dioxide.

The preferred form of introducing the silicon monoxide is by supporting it in a platinum boat from which it is sublimed at a temperature of 1100° C. to 1300 C. The film of silicon dioxide is deposited on a substrate positioned above the plasma and the silicon dioxide results in a uniform amorphous film and is carbon free and essentially water free.

Using the above method, a film of silicon dioxide is deposited from a stream of oxygen which has had introduced therein silicon monoxide, a film being deposited on a lead substrate with a film thickness of 500 A. having a resistivity greater than $10^9$ ohms per centimeter at 25° C.

Zeitschrift Electrochemistry, vol. 52, pages 343–347, 1949, indicates that silicon monoxide has the following properties: density 2.18; does not fluoresce in ultraviolet light; at a red heat it is still a nonconductor; is not attacked by sulfur at 1000° C.; heat of reaction for $Si+\frac{1}{2}O_2=SiO$ is $103\pm3K$ calories and heat of vaporization is established to be 70K calories.

The apparatus used is in the form of a Bell jar having a gas inlet at the top thereof and a gas outlet at the bottom. A flow of oxygen is passed through the upper portion of the Bell jar under a pressure of 20 to 200 microns of mercury. Spaced along the outside of the Bell jar are three electrodes. Two of the conductors have difference of potential of 1500 volts and operate at 1.5 megacycles, the third conductor being grounded. This creates within the Bell jar a plasma. Located adjacent to the oxygen inlet port is a lead substrate supported on a glass backing. This reaches a temperature of substantially less than 300° C.

Silicon monoxide supported in a platinum boat is positioned just below the plasma, and is heated to a temperature of approximately 1200 C. The vaporized monoxide flows upwardly in the oxygen forming the dioxide and the coating.

Silicon dioxide is deposited rapidly on the lead substrate and has a high resistivity for comparatively thin deposition. A second coating of lead may be placed upon the silicon dioxide and then a second coating of silicon dioxide may be placed thereover.

While in the above example, lead substrate has been used, niobium substrate may also be used as well as many other substrates. The substrate may be given other positions relative to the plasma.

These units may be used as memory units in a computer and other types of electronic devices now in common use. The advantages of the above process are the deposition of thin silicon dioxide layers at a low temperature with a high rate of deposition, such layers having a very high resistivity.

What I claim as new and desire to secure by Letters Patent of the United States is:

1. The method of forming a coating of an amorphous film of carbon free and substantially water free silicon dioxide which comprsies, forming a plasma in an oxygen environment of a pressure of 20–200 microns of mercury, contacting the plasma with silicon monoxide vapor to form silicon dioxide on a substrate positioned in the plasma environment.

2. The method as claimed in claim 1, wherein the substrate is positioned above the plasma.

3. The method as claimed in claim 1, wherein the silicon monoxide is sublimed at a temperature of 1100° C. to 1300° C.

References Cited

UNITED STATES PATENTS

| | | | |
|---|---|---|---|
| 2,879,360 | 3/1959 | Floyd | 117—106 X |
| 2,904,450 | 9/1959 | Irland et al. | 117—106 X |
| 3,093,507 | 6/1963 | Lander et al. | 117—106 X |
| 3,098,967 | 7/1963 | Keck. | |
| 3,161,946 | 12/1964 | Birkenbeil | 117—107 X |

OTHER REFERENCES

Holland; Vacuum Deposition of Thin Films, 156, pp. 488 and 489 relied upon.

ALFRED L. LEAVITT, *Primary Examiner.*

A. GOLIAN, *Assistant Examiner.*

U.S. Cl. X.R.

117—93.2, 106, 201